(12) United States Patent
McAdam et al.

(10) Patent No.: US 6,430,714 B1
(45) Date of Patent: Aug. 6, 2002

(54) FAILURE DETECTION AND ISOLATION

(75) Inventors: Patrick J. McAdam, Shrewsbury; Peter Kushner, Fiskdale; Brian K. Bailey, Sterling, all of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/369,712

(22) Filed: Aug. 6, 1999

(51) Int. Cl.[7] .............................................. G06F 11/16
(52) U.S. Cl. .............................. 714/704; 714/57; 714/6
(58) Field of Search .................................. 714/719, 704, 714/6, 7, 20, 48, 57

(56) References Cited

U.S. PATENT DOCUMENTS

| | | | | |
|---|---|---|---|---|
| 3,622,984 A | * | 11/1971 | Eastman | 714/762 |
| 3,704,363 A | * | 11/1972 | Salmassy et al. | 714/704 |
| 5,638,518 A | * | 6/1997 | Malladi | 709/251 |
| 5,666,512 A | * | 9/1997 | Nelson et al. | 711/114 |
| 5,802,080 A | | 9/1998 | Westby | 371/53 |
| 5,890,214 A | * | 3/1999 | Espy et al. | 711/114 |

OTHER PUBLICATIONS

"Fibre Channel and Related Standards" Martin Sachs IEEE Communications Magazine Aug. 1996 pp. 40–50.*

* cited by examiner

Primary Examiner—Albert Decady
Assistant Examiner—Cynthia Harris
(74) Attorney, Agent, or Firm—Bromberg & Sunstein LLP (57) ABSTRACT

A method for detecting faulty equipment on a loop of disk drives in which error counts are obtained for each disk drive including an amount of invalid transmission words and/or a count of loop initialization protocols (LIPs) that have been initiated and received. Counts are obtained twice so as to detect changes to the error counts. Based on the error counts and LIP counts suspect disk drives may be recorded along with their electrical predecessor on the loop to permit expedited identification of faulty equipment.

26 Claims, 11 Drawing Sheets

FAILURE DETECTION AND ISOLATION

TECHNICAL FIELD

This invention relates to the detection of equipment failures on a disk array connected over a loop such as a Fibre Channel loop.

BACKGROUND OF THE INVENTION

Subsystems comprising disk arrays, i.e., groups of small, independent disk drive modules used to store large quantities of data have been developed and found to possess many advantages over a single large disk drive. For example, the individual modules of a disk array typically take up very little space and typically use less power and cost less than a single large disk drive, yet, when grouped together in an array, provide the same data storage capacity as a single large disk drive. In addition, the small disks of an array retrieve data more quickly than does a single large disk drive because, with a small disk drive, there is less distance for the actuator to travel and less data per individual disk to search through. The greatest advantage to small disk drives, however, is the boost they give to I/O performance when configured as a disk array subsystem.

On a disk array system, a failure in any one disk drive in the array will require identifying which of the many disk drives in the array was the cause of the problem. With the advent of communication loops for connecting the disk drives of an array, the need to identify and remove a faulty drive becomes particularly desirable as communications are being passed through the receiver and transmitter of each disk drive on the loop. Arbitrated loop protocols such as Fibre Channel are becoming popular for providing high speed communications in a disk array. A difficulty one may run into on a Fibre Channel disk array system is that while the standard failure identification is by target, in this case the logical unit (LUN) that received the I/O request from the host, any non-target drive in the Fibre loop may have actually perpetrated the error. More generally, in sending a data word from a host to one of the disks on the loop, the word must pass through receivers and transmitters in each of the disk drives electrically between the host and the target disk drive on the loop. If an error in the word is caused by any of the receivers or transmitters along the way, an error is reported by the target disk drive. While the system is aware of the error, it typically is not able to determine which of the disk drives on the loop was the cause of the error. Trial and error diagnostics need to be implemented in order to locate the faulty equipment.

SUMMARY OF THE INVENTION

Requests are made to each of the disk drives on a loop of disk drives for a count of errors so that an increase in the number of errors may be detected and reported. Detection of an invalid transmission word can take place at intermediate disk drives between an initiator sending the data word and the target drive. As such, detection of occurrences of an invalid transmission word can be used to identify faulty equipment, either receivers or transmitters, in disk drives that are located on a loop.

A loop of disk drives, such as a Fibre Channel loop, typically permit disk drives to initiate a loop initialization protocol (LIP). The loop initialization protocols are typically initiated upon adding a disk drive to a loop, upon power up or for error recovery. In order to assist and properly identify failed equipment on a loop of disk drives, a count of LIPS initiated and received by each disk drive is requested from the disk drives on the loop. The occurrences of LIP initiations and LIP receptions are synchronized with disk drive error requests and compared to identify disparities indicative of a failure on the loop. Also, any initiation of a certain type of LIP, which we shall refer to as an "error-indicating LIP", is indicative of a failure in a disk drive or possibly its electrical predecessor. In accordance with a particular embodiment of the invention, initiation of any LIP by a disk drive is indicative of a failure in a disk drive or its electrical predecessor on the loop. Furthermore, when LIP receptions are identified at disk drives on a loop but no corresponding LIP initiation is identified, the equipment failure might not be a disk drive, but rather from other equipment on the loop such as a host bus adapter.

In accordance with an embodiment of the invention, the error count may include both the amount of invalid transmission words and the number of loop initialization protocols initiated and received. All such counts may be requested over the Fibre Channel loop from each disk drive on the loop. The baseline count is achieved in a first request. A second request for the counts permits the detection of changes in the counts on the disk drives in the loop. If no LIPs have occurred, the change in error count is used to identify a suspect disk drive. Also, the electrical predecessor on the loop is recorded since an error may have been caused by the transmitter of the predecessor or the receiver of the error detecting disk drive. When LIPs are detected, they are used to help locate the source of the errors. The methods of the present invention may be embodied on a computer program product for use on a computer system.

Embodiments of the invention advantageously achieve early and quick detection of failed equipment on the loop. The LIP counts may advantageously identify a non-disk drive error and thus save the time and effort in doing a trial and error diagnostic at each of the disk drives in the loop. Furthermore, by making the initiation of any LIP indicative of an equipment failure in a disk drive or its electrical predecessor, earlier detection of failed equipment is made possible.

Other objects and advantages of the invention will become apparent during the following description of the presently preferred embodiments of the invention taken in conjunction with the drawings.

DETAILED DESCRIPTION OF THE PREFERRED EMBODIMENTS

The embodiments of the invention are described herein with respect to a loop of disk drives, but may be equally adapted for use with other devices on the loop as well. The embodiments will be described in particular with respect to a Fibre Channel loop. However, transport vehicles other than Fibre Channel may incorporate the features needed for the failure detection algorithms of the present invention as well.

A Fibre Channel loop can connect 2 to 126 node ports. A node may be any sort of device including a work station, a printer, a disk drive, a scanner, etc. Each node has at least one port for communicating on the Fibre Channel loop. The ports on a Fibre Channel arbitrated loop (FC-AL) are called node ports. The arbitrated loop protocol is a token acquisition protocol. Thus, each port on the same arbitrated loop sees all messages, but passes all messages addressed to other ports. Thus, each port has a receiver and a transmitter. Each node is connected to the loop by port bypass circuits. By controlling the port bypass circuit, a disk drive on a node can be added to a loop or removed from the loop without breaking the loop.

On Fibre Channel, a transmission word corresponds to four 10-bit encoded bytes. Thus, a transmission word is 40 bits long. It is the smallest unit of transmission on the Fibre Channel.

Every device on a Fibre Channel arbitrated loop must have a physical address referred to in Fibre Channel as an arbitrated loop physical address (AL_PA). A loop initialization process is run in order to obtain or verify the physical addresses of each node on the loop. Loop initialization occurs at power up, when a new node is inserted in the loop or for error recovery. Most often, the address on the loop is determined by the hard assigned physical address determined by the back panel.

In Fibre Channel, there are two identified reason codes for initiating a LIP. A LIP F8 is initiated due to detection of a loop failure. Typically this is caused by a device having a failure with its own receiver or with the transmitter of the electrical predecessor on the loop. Either of these may cause a problem with the information being received by that device. Thus, initiation of a LIP F8 is an error-indicating LIP indicative of an equipment problem in the receiver of the initiator or the transmitter of the predecessor to the initiator. A LIP F7 is used when a port wants to acquire a physical address, for example, when it is added to the loop or when the port detects an interference with its performance, for example, difficulty in winning arbitration to get messages onto the loop. In accordance with an embodiment of the present invention, devices on the loop may be programmed not to initiate LIP F7's. Rather these would be initiated instead by a program running on a host or supervisory computer which monitors the loop and initializes it as necessary. With this protocol in place, initiation of any LIP by a disk drive would be indicative of an error in the drive or in its electrical predecessor.

Figure 1:
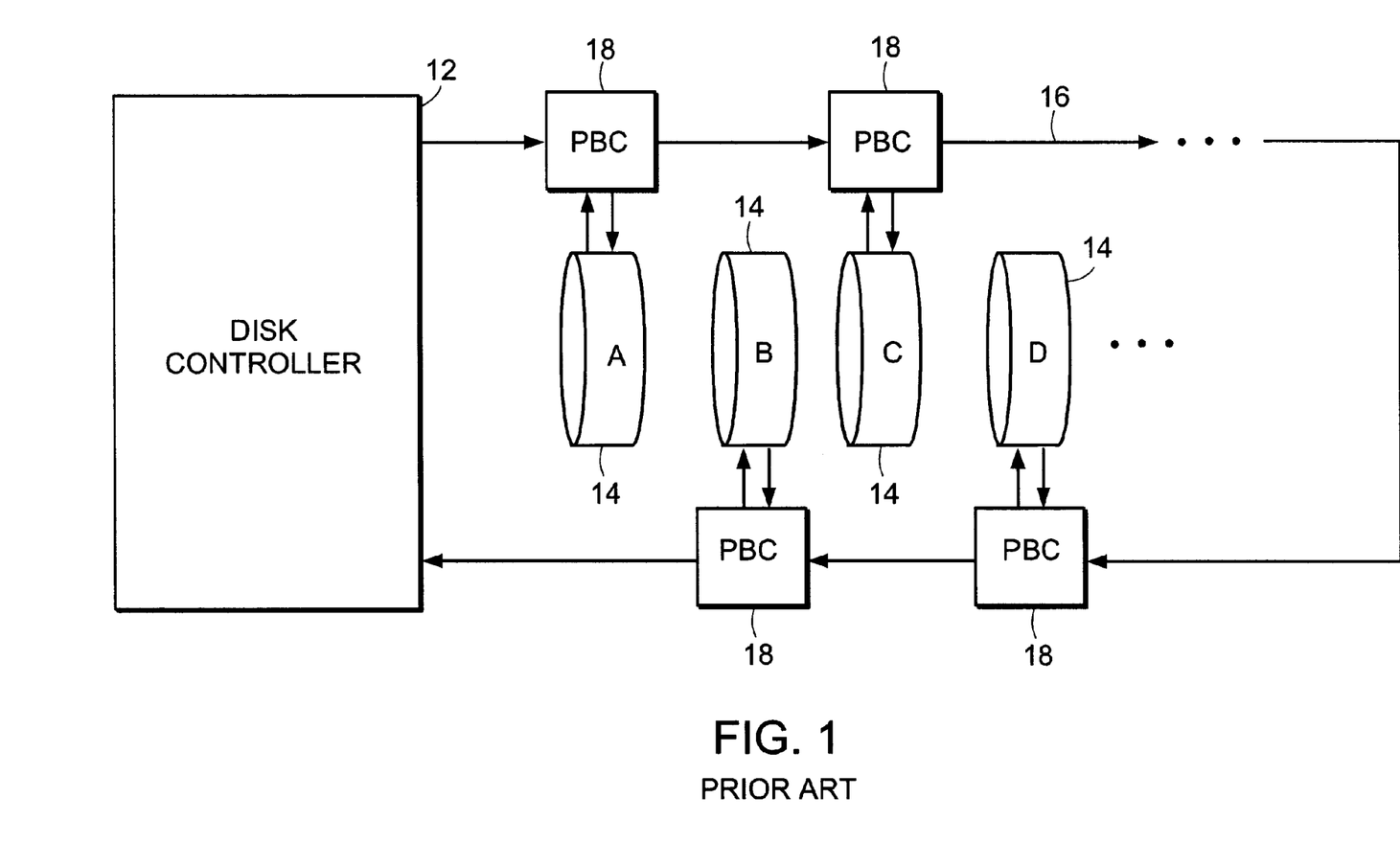
FIG. 1 is a block diagram of a disk array on a loop.

The concept of an electrical predecessor can be easily understood upon referring to the disk array on a loop shown in FIG. 1. A disk controller 12 manages the data storage in the disk drives. The controller 12 may implement any of a number of RAID algorithms to organize the data on the disks. Disk drives 14 are physically arranged in alphabetical order (A, B, C . . . ) in FIG. 1. Each disk drive 14 is connected to the loop 16 by a port bypass circuit 18. The port bypass circuit 18 can be switched to include its disk drive 14 in the loop 16 or may be switched to bypass its disk drive 14. With disk drives A, B and C in the loop, although disk drive B physically precedes disk drive C, the electrical predecessor of disk drive C on the loop is disk drive A. The electrical predecessor will vary depending on which drives are switched into connection with the, loop. A disk array configuration for use of the Fibre Channel loop is shown in U.S. Pat. No. 5,890,214 issued Mar. 30, 1999. The full disclosure of this patent is hereby incorporated by reference herein.

It is desirable to provide a failure detection algorithm that can operate using link service frames over the Fibre Channel layer. Link service frames are typically used for establishing operating parameters, performing channel level error recovery and checking the status of the physical link between two devices. It is desirable in accordance with embodiments of the invention to provide an error count that includes a count of invalid transmission words detected at a device as well as a LIP count for both LIP types of LIP initiations and LIP receptions. Using techniques known in the art, a disk drive maker can make this error information available from a disk drive through link services.

Referring now to FIGS. 2a–2i, program flow for failure detection shall be described. Such a program could be run in a disk controller 12, a host coupled to the disk controller, a host connected to the loop through a host-bus adapter or a controller otherwise coupled to the loop of disk drives to be tested. The program can run repeatedly in a multi-tasking processor. For example, the disk controller can be set up for multitasking.

The disclosed program flow for detecting faulty equipment in a disk array on a loop may appear in a computer program product for use with a computer system. Such program may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). Those skilled in the art should appreciate that the computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Figure 2A:
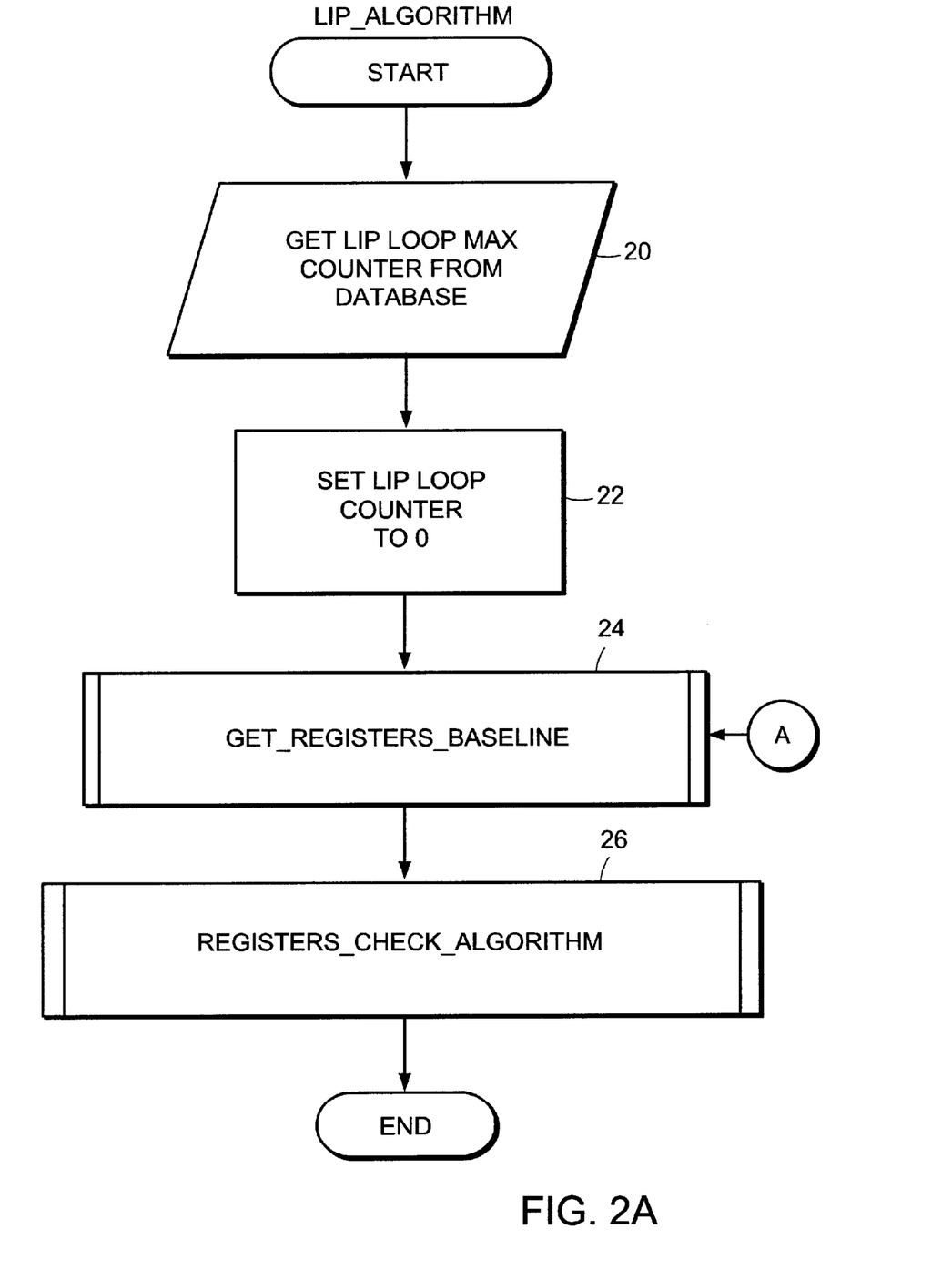
FIGS. 2a–2i are flow charts of methods for detecting faulty equipment on a loop of disk drives.
Figure 2B:
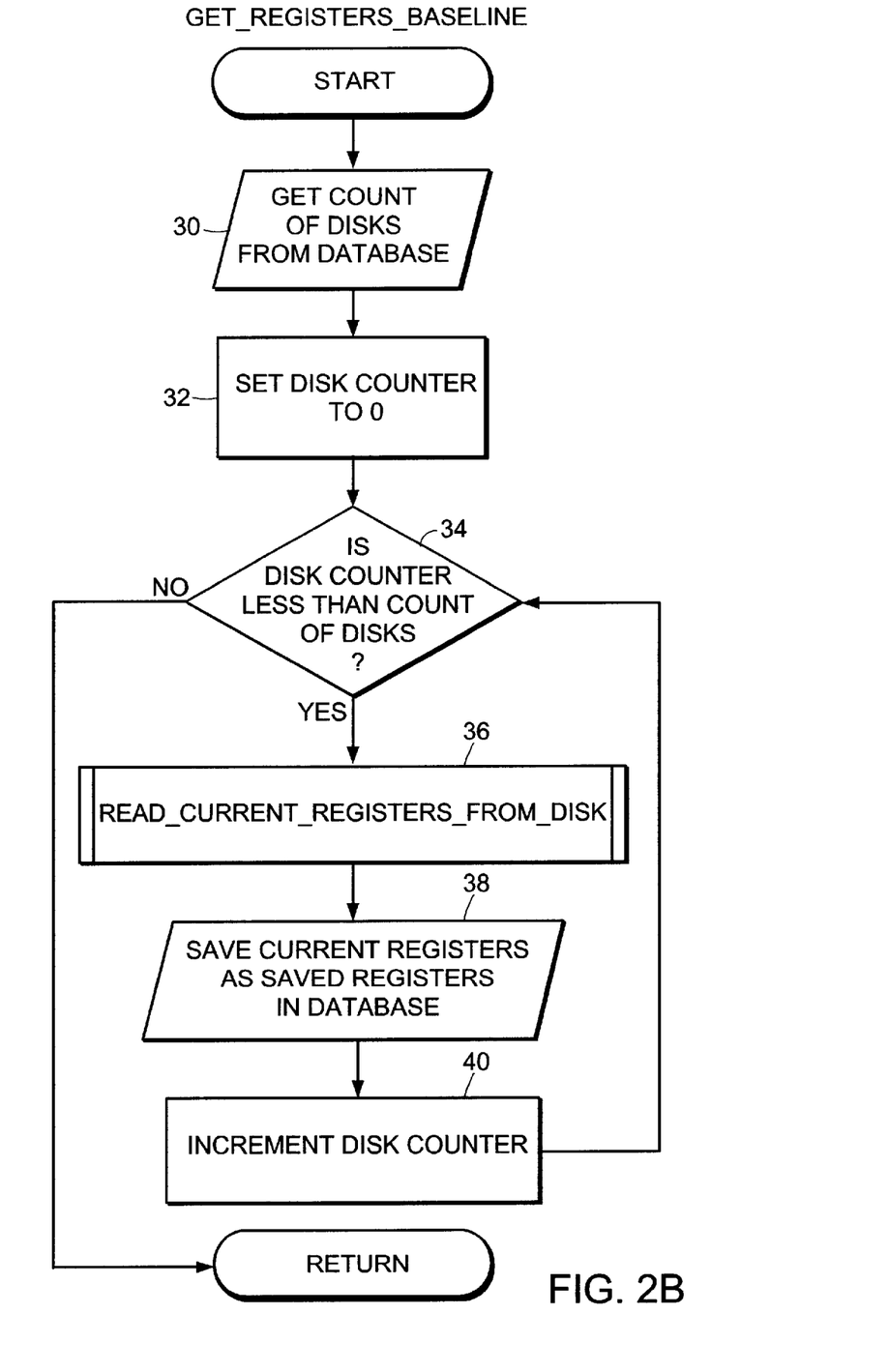

The program flow begins by getting 20 a LIP loop max counter from the database. The value of the max counter can be set by a user. The counter provides a maximum number of times the algorithm may repeat before aborting when a fault situation repeats in which the LIP received count does not increase for every disk drive on the loop in equal numbers to the LIP initiations. A LIP loop counter is initially set 22 to zero. An initial error count is obtained through the get register's baseline program 24 of FIG. 2b. Here, the initial counts of invalid transmission words, LIPs received and LIPs initiated, are obtained from each of the disk drives on the loop. The program flow is shown in FIG. 2b as follows. In order to make sure that all of the disks on the loop are requested to provide their error count information, the flow begins by getting a count 30 of all the disks. A disk counter is set 32 to zero. At a program reiteration point, the disk counter is checked 34 to determine whether all of the disks have been interrogated. Upon completion, flow returns to the main algorithm of FIG. 2a. For each disk, flow moves to FIG. 2c in which the current status of the error registers is requested 36 and obtained from each disk.

Figure 2C:
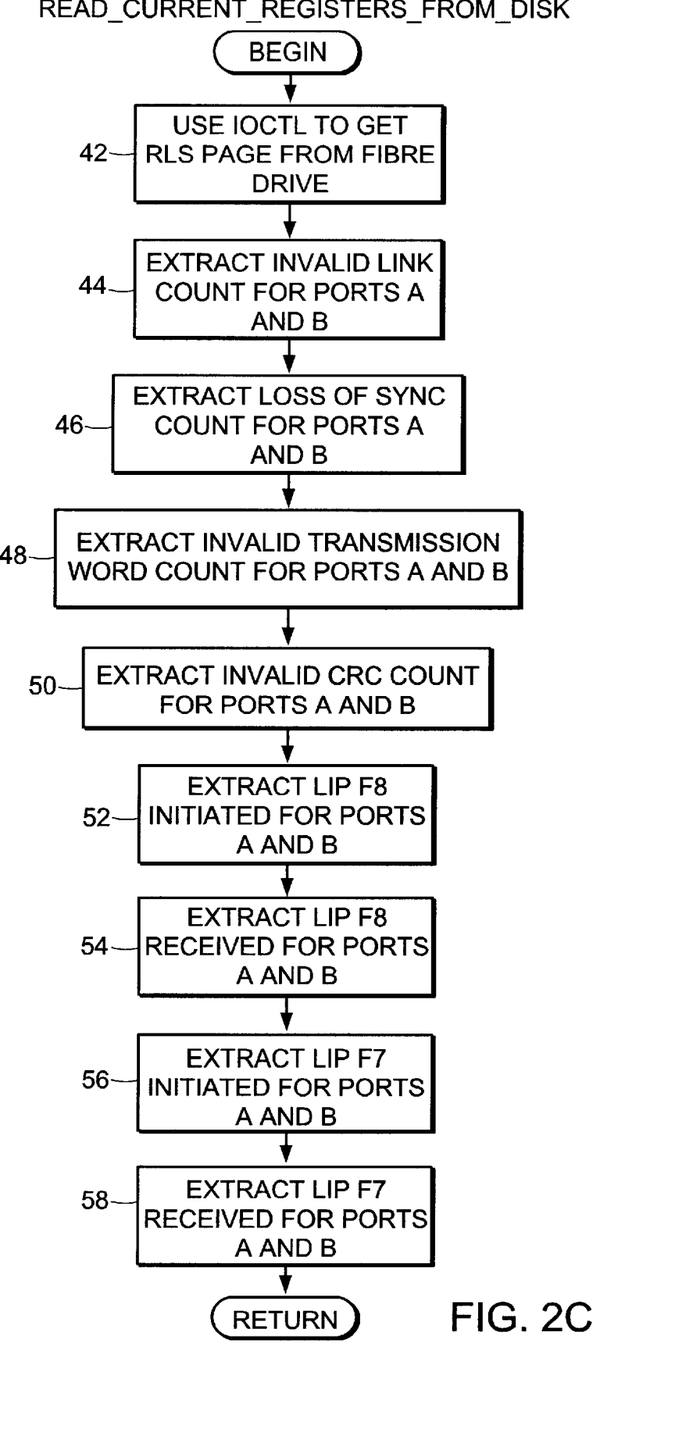

Referring to FIG. 2c, the error count including invalid transmission words and LIPs initiated and received, are requested 42 using pseudo driver pass thru commands (I/O CTL) to get to the Read Link Services (RLS) page and/or the vendor specific diagnostic page from a disk drive on the Fibre Channel. It has been conventional to deploy and make available in the link services page error counts such as invalid link count and loss of sync count. In accordance with embodiments of the present invention, additional error counts and LIP counts found in the link services page are also deployed, including invalid transmission word count, invalid CRC count and LIP F8 and LIP F7 initiations and receptions. The relevant information is extracted from the RLS page by the program to provide a first, i.e., baseline, error count for each of these attributes. The sequence is unimportant but as shown in FIG. 2c, the invalid link count is extracted 44. The counts are obtained for all ports of the disk drive. A disk drive connected to two redundant Fibre Channel loops would have two ports, for example, Port A and Port B. The loss of sync is extracted 46. The Invalid Transmission word count is extracted 48. The invalid CRC count is extracted 50. The LIP F8 initiated count is extracted 52. The LIP F8 received count is extracted 54. The LIP F7 initiated count is extracted 56. The LIP F7 received count is extracted 58. All of this extracted error count information referring now to FIG. 2b, is saved 38 in the saved registers of the database used by the fault detection program.

The disk counter is incremented 40 and the reading of the initial error count information continues for each of the disks until every disk 34 on the Fibre Channel has been accounted for. The program flow then returns to FIG. 2a which then calls for the registers check algorithm of FIG. 2d.

Figure 2D:
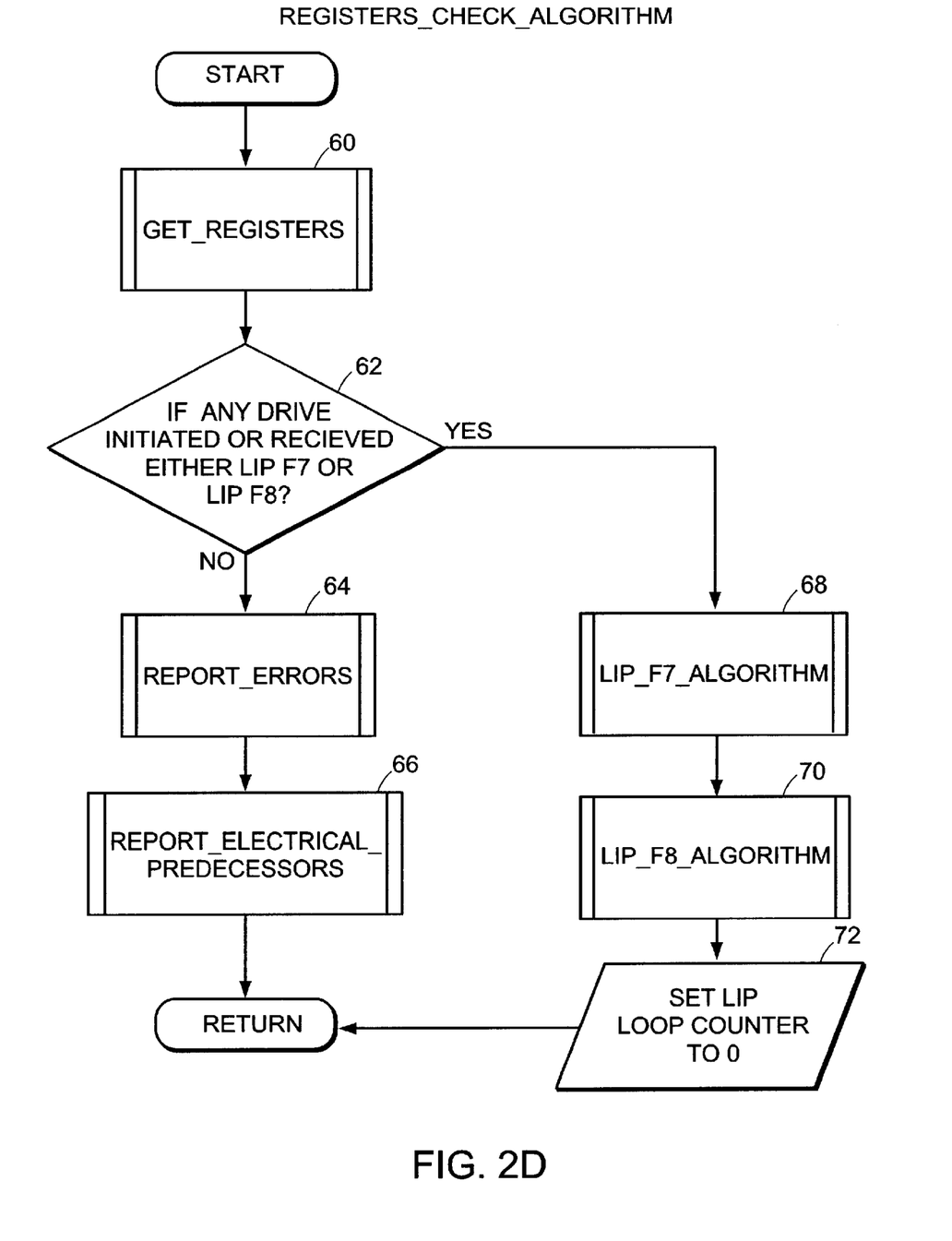
Figure 2E:
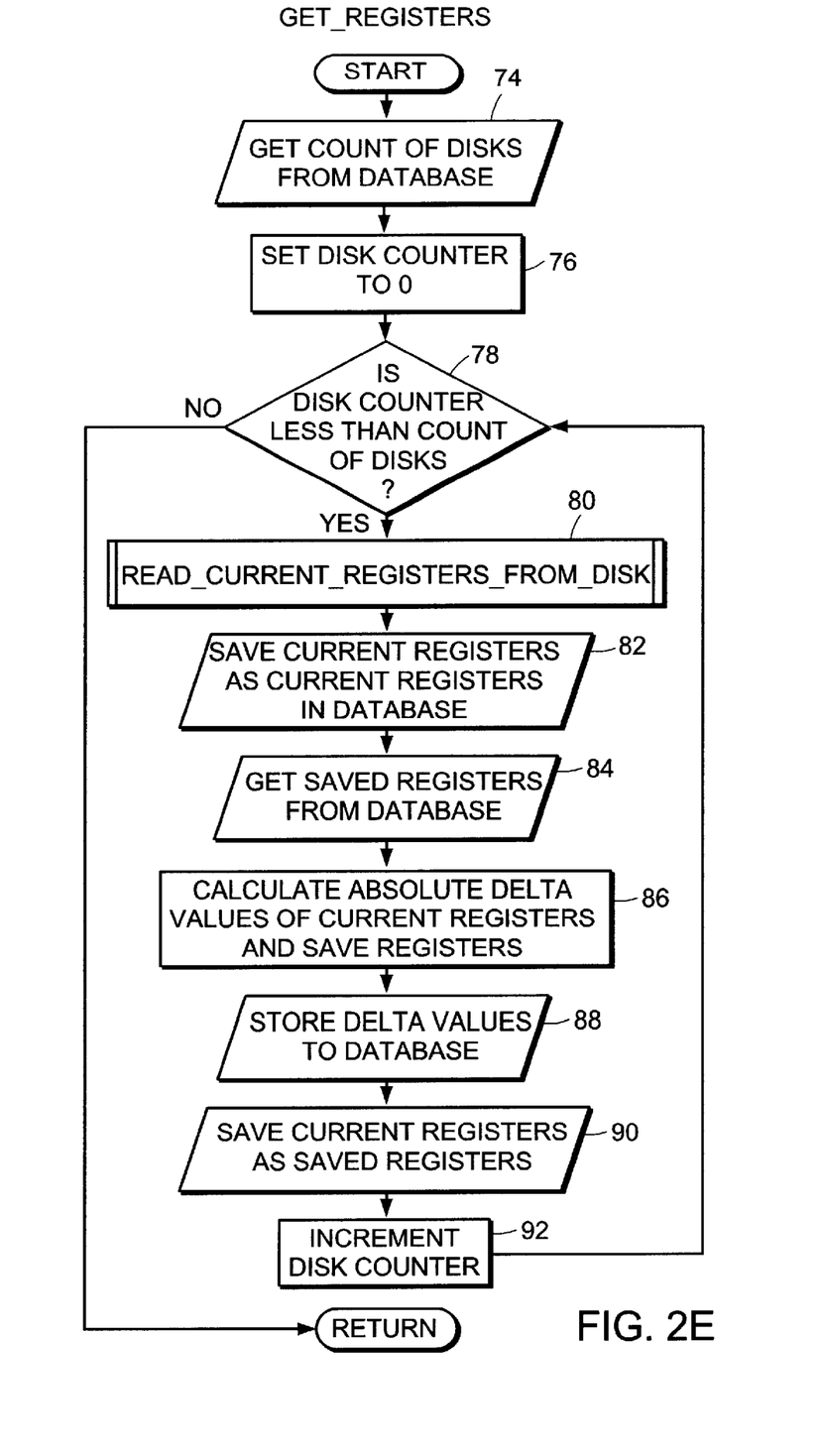

The registers check algorithm program begins by calling 60 the "get registers" flow of FIG. 2e. The function of "get registers" is to again request an error count including the invalid transmission words and the LIPs initiated and received. Upon receiving this second error count from each of the disk drives, the second obtained error count is compared with the baseline error count to obtain a delta value corresponding to the change in error counts between the first request for error counts and the second request for error counts. Referring more particularly to the "get registers" program flow, the total disk count is obtained 74 from the database. A disk counter is set 76 to zero. At a reiteration point of the program, the disk counter is checked 78 to see if all of the disks have been polled for their error counts. Requests then go out to each disk to obtain 80 the error counts and LIP initiation and reception counts from their corresponding registers. This is done using the program flow previously discussed with respect to FIG. 2c. The error counts are saved 82 in "current" registers in the database. The previously saved registers with the first count information are obtained 84 from the database. A comparison of the two counts is made to obtain a determination 86 of the change in error counts including the invalid transmission words as well as the LIP initiations and receptions. The change in error counts is stored 88 in the database. The current registers are then saved 90 as the saved registers in the database. The desk counter is incremented 92 and this process is repeated for every disk on the loop.

Figure 2F:
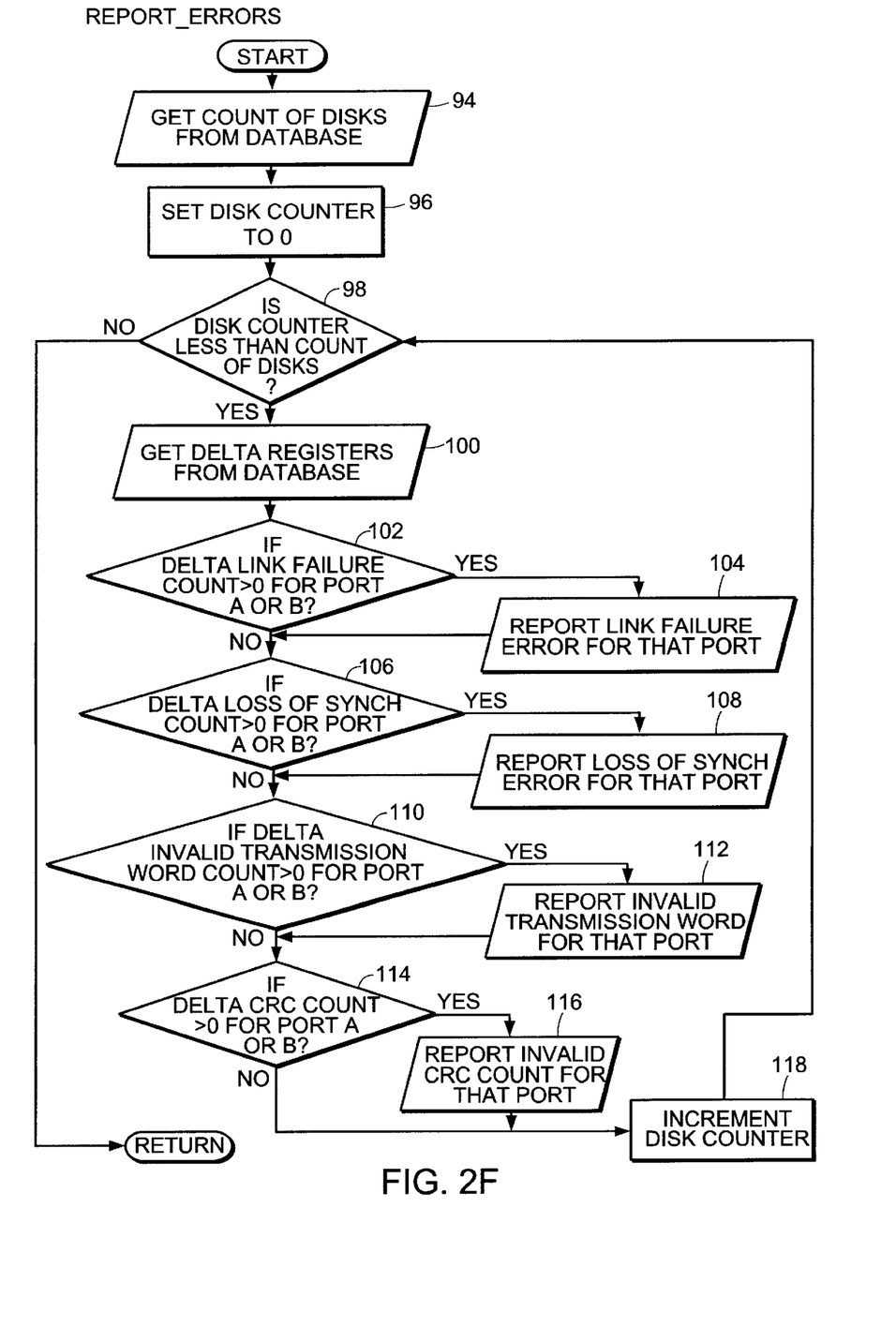

Upon completion of the process of obtaining the change in error counts for every disk, flow returns to a decision point 62 in the registers check algorithm of FIG. 2d. Here, an embodiment of the invention takes advantage of the LIP F7 and LIP F8 information. If no LIP F7 or LIP F8 had been initiated or received, program flow proceeds to reporting the errors 64 and recording the electrical predecessors 66 to those disk drives with an error. The reporting errors flow is shown in FIG. 2f. In general, this flow reviews the change in error count information stored in the database and reports out each disk that is determined to have an increase in the error count between the first error count and the second error count. Of particular importance is the reporting of the invalid transmission word counts. This is an error that gets detected in the loop 16 at the first occurrence of the error. Once detected, an 8B/10B error is corrected but an indication that the data is defective is sent along through the loop so that the data word will not be relied upon. According to conventional protocol, the target drive will report the error back to the initiator that sent the data. Therefore, the initiator will not know where in the loop the error occurred. Thus, this diagnostic is of great value in identifying the source of errors.

Returning in particular to the flow of the report errors program in FIG. 2f, the total count of disks in the database is determined 94, and a disk counter is set 96 to zero. A reiterative decision point 98 is reached for making sure the errors are reported from every disk in the database. The delta register information with the change in error count for each type of error in each disk is obtained 100 from the database. Any error change count is reported for the port of the disk drive that had the error. It is noted that the reporting of errors includes reporting 112 of invalid transmission word errors corresponding to an 8B/10B coding error identified at the disk drive. The reporting of the errors is performed for each disk drive in the database.

Figure 2G:
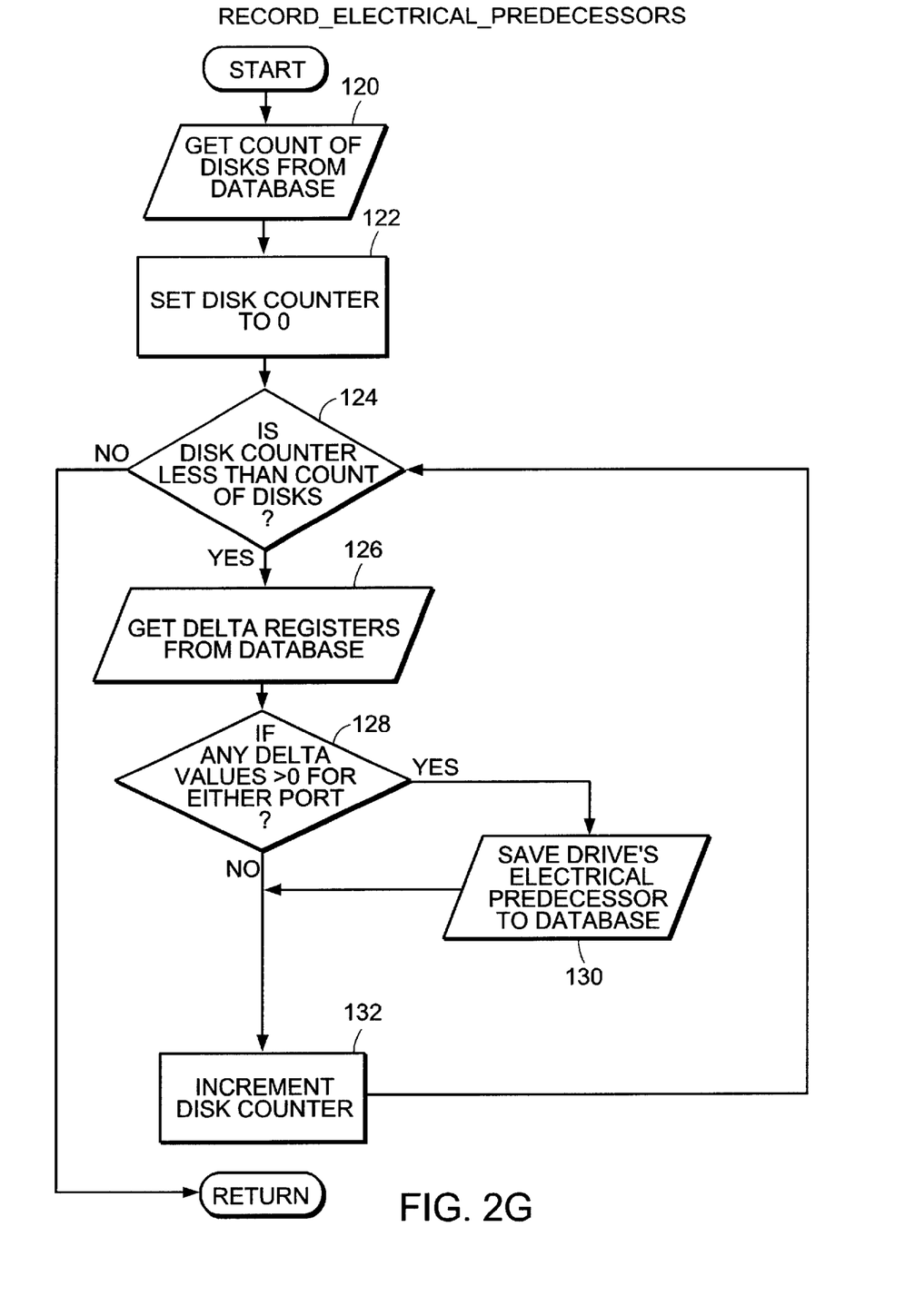

Upon completion of reporting errors, flow returns to the registers check algorithm of FIG. 2d which initiates the record electrical predecessor's flow of FIG. 2g. Here, once again a count of the disks in the database is obtained 120 and a disk counter is set 122 to zero. A decision point 124 checks the counter to see that all disks in the database are subject to the record electrical predecessor's program. The delta registers with the change in error count for each disk is obtained 126 from the database. For any error found for any port of the disk drive 128, the program saves 130 an indication of the drive's electrical predecessor on the Fibre Channel loop. The electrical predecessor is saved to the database so that the database includes an indication of each of the disk drives that had an error as well as the electrical predecessor for each of those drives. A disk counter is incremented 132 each repetition of the record electrical predecessors program until all of the disks have been reviewed for error.

The drives with an error and their electrical predecessors comprise the list of suspect drives which may have faulty transmitter or receiver equipment. The user may take advantage of this information so as to quickly diagnose which disk drives need to be removed from the system. The user has available a number of choices for identifying which particular drive has the faulty equipment. For example, the user may run a diagnostic program which sends data to be written into the disk drive's buffer and retrieving that data to see if the receiver and transmitter equipment operates properly under tests. In a presently preferred test, 128 kilobytes of 0x7E is transferred into the disk drive's buffer. The test may also include transferring four 32-bit repeating patterns such as 0x 7E7E7E7E; 0x 00000000; 0x FFFFFFFF; 0x AAAAAAAA. Of course, other patterns may be used as well. The transfer size for a diagnostic is preferably no larger than the maximum buffer size or maximum permissible physical I/O. The tests may be conducted without writing the data to the actual disk media to avoid corrupting the user data during tests. Alternatively, disk drives can be removed from the loop and returned one at a time to determine which is at fault. These drives can be removed physically or port bypass circuits can be used to electrically switch a disk drive in or out of the loop. Upon recording the disk drives with errors and their electrical predecessors, the monitoring program is complete. The program can be restarted periodically to maintain a check on how the equipment is performing.

Figure 2H:
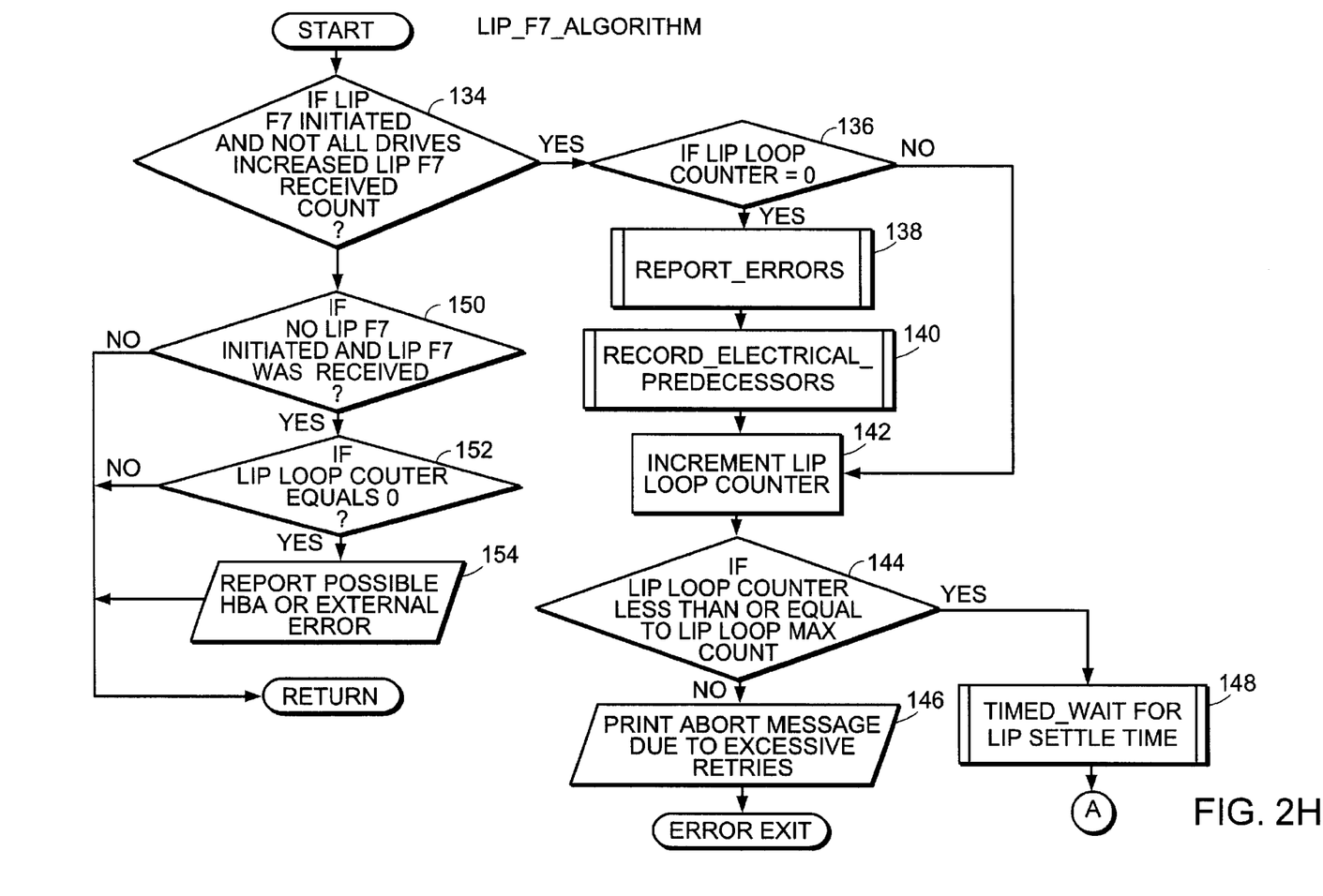

Returning now to the registers check algorithm of FIG. 2d, we now consider the situations in which a LIP was initiated or received by any of the disk drives on the loop. If any such LIP was detected, the LIP F7 algorithm 68 is performed as shown in FIG. 2h. If no LIP F7 was initiated or received, program flow will quickly proceed to the LIP F8 algorithm 70 of FIG. 2i. Also, if a LIP F7 was initiated and was received by all of the drives, program flow also proceeds to the LIP F8 algorithm 70 which handles reporting that error situation. If LIP F7 was initiated but not all of the drives increased their LIP F7 received count 134, two problems are indicated. First, the LIP F7 was initiated although the drives have been programmed not to initiate such. Second, not all the drives received the LIP F7. In the first iteration 136 of the program when the loop counter equals 0, the program flow will cause a reporting of the disk errors 138 and recording 140 of the electrical predecessor disks to those disks that had an error. The loop counter is then incremented 142 so that the fault detection program can be repeated while monitoring if the discrepancy between LIP initiation and LIP receptions continues. If in each iteration of the monitoring program the discrepancy between LIP F7 initiations and receptions continues, an abort message will be issued 146 after the LIP loop max count has been reached 144. Until the loop max count is reached 144, each iteration of the monitor program will be delayed by a timed wait 148 to give the loop time to stabilize. Then flow returns to Get Registers Baseline 24 in FIG. 2a.

In the situation where a LIP F7 was received but not initiated 150, the LIP loop counter is checked 152 and if it equals 0 indicating it is the first iteration of the fault detection monitoring program, a possible error is indicated 154 with a host bus adaptor or external error. In this situation, the algorithm advantageously ignores the disk errors as the monitoring of LIP F7 indicates that any such disk errors may be caused by faulty external equipment. Flow then proceeds through the LIP F8 algorithm of FIG. 2i. If there was no LIP F8 at all or if the LIP F8 initiations match the LIP F8 receptions by all drives, an error is recorded 156 with any of the originating drives of a LIP. This may be the drive that initiated the LIP F8 or the drive that originated a LIP F7 that was received by all drives. The predecessor drive to the originating drive is also recorded 158. By monitoring the occurrence. of a LIP, the fault detection program advantageously avoids reporting errors from the disk drives and instead is reporting the originator of the LIP. If a LIP F8 was received but there is no report of its being initiated 160, the first time the monitor program is run 162, a possible error with the host bus adaptor or external equipment is reported 164. Again, the program avoids reporting disk errors when the problem may more likely be with some external equipment. If the LIP F8 was received and no indication of an initiation of a LIP F8 was found but this is a second or more iteration of the fault detection program, the LIP loop counter is checked 180 to determine if the maximum count has been reached. After the maximum iterations an abort message is reported 182. Prior to reaching the maximum count, a time delay 184 to wait for the loop to stabilize is forced before repeating the program at Get Registers Baseline 24 in FIG. 2a.

Figures 2I, 2I:
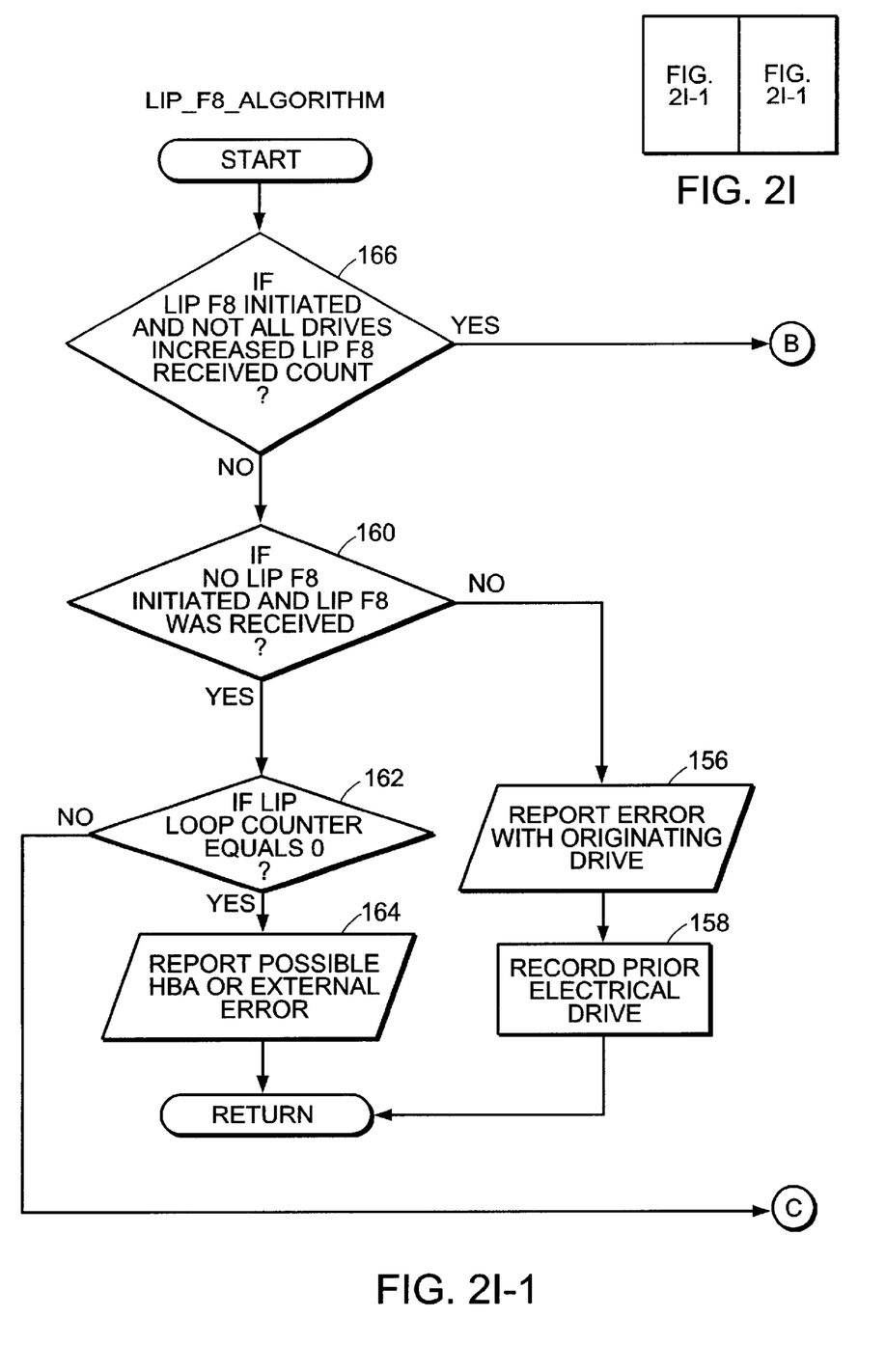
Figure 2I:
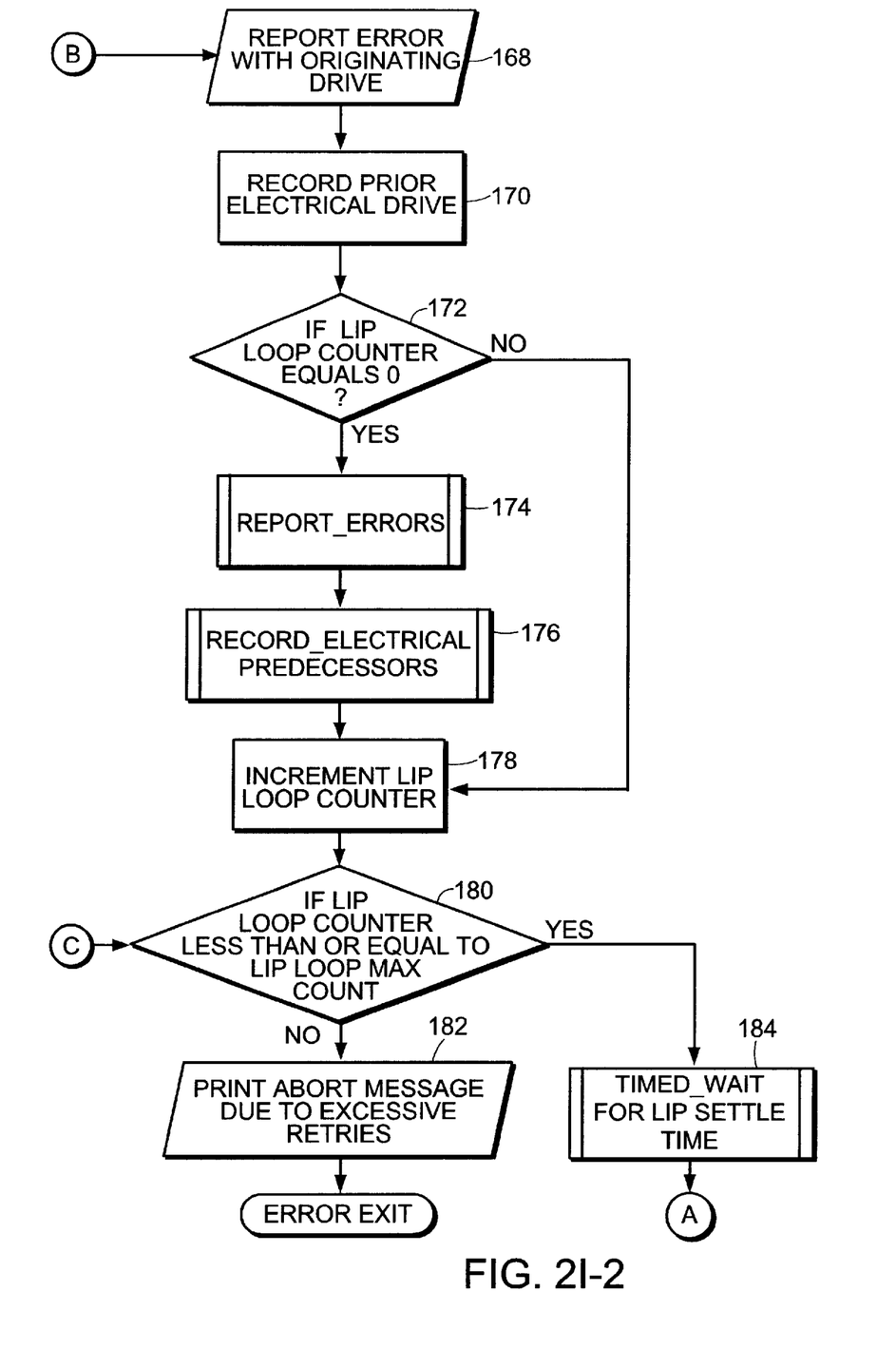

In a situation of a LIP F8 being initiated but not received by all disk drives on the loop 166, an error is reported 168 with the drive originating the LIP. The electrical predecessor drive to that originator is also recorded 170. In the first iteration of the fault detection monitoring program, disk errors are reported 174 along with recording 176 of their electrical predecessors. If this is a second or higher iteration of the fault detection program, then the program has already reported the individual disk errors and is instead trying to determine if the loop has been able to stabilize in terms of achieving a successful initialization with a LIP. A LIP counter is incremented 178. If the maximum number of iterations has been reached 180, then the abort message is reported 182 or printed due to excessive retries. However, if there are additional tries to be made, a timed delay is enforced 184 before repeating the program again.

Of course, it should be understood that various changes and modifications to the preferred embodiment described will be apparent to those skilled in the art. For example, the sequence of the program flow may be altered and yet still take advantage of the count of invalid transmission words in accordance with an embodiment of the invention. Alternative program flow sequences are also available which make use of the counts of LIP F7s and/or LIP F8s to achieve faulty equipment diagnostics in accordance with embodiments of the invention. These and other changes can be made without departing from the spirit and the scope of the invention and without diminishing its attendant advantages. It is therefore intended that such changes and modifications be covered by the following claims.

We claim:

1. On a Fibre Channel loop of disk drives, each disk drive electrically succeeding and preceding another of the disk drives on the loop, a method for detecting faulty equipment on the loop comprising:

requesting from each disk drive on the loop a first error count, including an amount of invalid transmission words;

requesting from each disk drive on the loop a second error count, including an amount of invalid transmission words;

comparing the first and second error counts to detect changes to error counts for each disk drive in the loop;

recording an indication of any disk drive with a change in error count.

2. The method of claim 1 further comprising recording an indication of an electrical predecessor for each of said disk drives with the change in error count.

3. The method of claim 1 wherein said steps of requesting further asks for a count of loop initialization protocols (LIP) initiated and received by each disk drive on the loop.

4. The method of claim 3 further comprising using the count of LIPs initiated and received to locate a source of errors.

5. The method of claim 4 wherein said step of using the count of LIPs comprises reporting a possible non-disk drive error if LIP reception was detected and LIP initiation was not detected.

6. The method of claim 4 wherein said step of using the count of LIPs comprises reporting an indication of any disk drive that originated a LIP.

7. The method of claim 4 wherein said step of using the count of LIPs comprises reporting an indication of any disk drive that originated an error-indicating LIP.

8. The method of claim 3 further comprising repeating the method when a LIP was initiated but not all drives indicate a LIP was received.

9. The method of claim 8 further comprising counting how many times the method is repeated.

10. The method of claim 9 further comprising aborting the method after the count of times the method is repeated reaches a predetermined maximum.

11. The method of claim 1 wherein an invalid transmission word is indicative of an 8B/10B error.

12. On a Fibre Channel loop of disk drives, each disk drive electrically succeeding and preceding another of the disk drives on the loop, a method for detecting faulty equipment on the loop comprising:
   requesting from each disk drive on the loop a first LIP count, including an amount of loop initialization protocols (LIPs) that have been initiated and received;
   requesting from each disk drive on the loop a second LIP count, including an amount of LIPs that have been initiated and received;
   comparing the first and second LIP counts to identify LIP initiations and receptions; and
   comparing the LIP initiations and LIP receptions to locate a source of errors.

13. The method of claim 12 wherein said steps of requesting further include requesting an error count including an amount of invalid transmission words from each of said disk drives on the loop.

14. The method of claim 13 further comprising recording an indication of any disk drive with a change in error count.

15. The method of claim 12 wherein said step of comparing the LIP initiations and LIP receptions comprises reporting a possible non-disk drive error if LIP receptions were identified and LIP initiation was not detected.

16. The method of claim 12 wherein said step of comparing the LIP initiations and LIP receptions comprises reporting an indication of any disk drive that originated an error-indicating LIP.

17. The method of claim 12 wherein said step of comparing the LIP initiations and LIP receptions comprises reporting an indication of any disk drive that originated a LIP.

18. The method of claim 12 further comprising repeating the method when a LIP was initiated but not all drives indicate a LIP was received and counting how many times the method is repeated.

19. The method of claim 18 further comprising aborting the method after the count of times the method is repeated reaches a predetermined maximum.

20. On a Fibre Channel loop of disk drives, each disk drive electrically succeeding and preceding another of the disk drives on the loop, a method for detecting faulty equipment on the loop comprising:
   requesting over the Fibre Channel loop from each disk drive on the loop a first error count, including an amount of invalid transmission words and a number of loop initialization protocols (LIPs) initiated and received;
   requesting over the Fibre Channel again from each disk drive on the loop a second error count, including an amount of invalid transmission words and a number of LIPs initiated and received;
   comparing the first and second error counts to detect changes to error counts for each disk drive in the loop;
   if no LIPs, identifying any disk drive with a change in error count;
   recording electrical predecessor of each of said disk drives with the change in error count; and
   if a LIP is detected, using the count of LIPs initiated and received to locate a source of errors.

21. The method of claim 20 wherein said step of using the count of LIPs comprises reporting possible non-disk drive error if LIP reception detected and LIP initiation was not detected.

22. The method of claim 20 wherein said step of using the count of LIP's comprises identifying any disk drive that originated an error-indicating LIP.

23. The method of claim 2 wherein said step of using the count of LIPs comprises identifying any disk drive that originated a LIP.

24. The method of claim 20 comprising repeating the method when a LIP was initiated but not all drives indicate a LIP was received.

25. The method of claim 24 further comprising counting how many times the method is repeated and aborting the method after the count of times the method is repeated reaches a predetermined maximum.

26. A computer program product for use on a computer system for detecting faulty equipment on a Fibre Channel loop, the computer program product comprising a computer usable medium having computer readable program code thereon, the computer readable program code including:
   program code for requesting over the Fibre Channel loop from each disk drive on the loop a first error count, including an amount of invalid transmission words and a number of loop initialization protocols(LIPs) initiated and received;
   program code for requesting over the Fibre Channel again from each disk drive on the loop a second error count, including an amount of invalid transmission words and a number of LIPs initiated and received;
   program code for comparing the first and second error counts to detect changes to error counts for each disk drive in the loop;
   program code for identifying any disk drive with a change in error count if no LIPs were initiated or received;
   program code for recording electrical predecessor of each of said disk drives with the change in error count; and
   program code for using the count of LIPs initiated and received to locate a source of errors if a LIP was detected.

* * * * *

UNITED STATES PATENT AND TRADEMARK OFFICE
CERTIFICATE OF CORRECTION

PATENT NO. : 6,430,714 B1
DATED : August 6, 2002
INVENTOR(S) : Patrick J. McAdam et al.

It is certified that error appears in the above-identified patent and that said Letters Patent is hereby corrected as shown below:

Column 8,
Line 48, change "(LIP)" to -- (LIPs) --

Column 10,
Line 18, change "2" to -- 20 --

Signed and Sealed this

Tenth Day of December, 2002

JAMES E. ROGAN
*Director of the United States Patent and Trademark Office*